OR 3,801,185

United States

Ramaswamy et al.

[11] 3,801,185
[45] Apr. 2, 1974

[54] SWITCH FOR THIN-FILM OPTICS

[75] Inventors: Vellayan Ramaswamy, Lincroft; Robert Dean Standley, Shrewsbury, both of N.J.

[73] Assignee: Bell Telephone Laboratories Incorporated, Murray Hill, N.J.

[22] Filed: Dec. 6, 1972

[21] Appl. No.: 312,478

[52] U.S. Cl............................ 350/160 R, 350/96 WG
[51] Int. Cl................................................ G02f 1/26
[58] Field of Search ........................ 350/160, 96 WG

[56] References Cited
UNITED STATES PATENTS
3,464,762   9/1969   Kahng................................. 350/160
3,736,046   5/1973   Zook.................................... 350/160

OTHER PUBLICATIONS
Channin, Voltage-Induced Optical Waveguide. Appl. Phys. Letters, Vol. 19, No. 5 (Sept. 1, 1971) pp. 128–130.
Laser Beam Steered by Electro-Optic Deflector Cell. Electronic Design, Vol. 12, No. 15 (July 20, 1964) pg. 22.

*Primary Examiner*—William L. Sikes
*Attorney, Agent, or Firm*—W. L. Wisner

[57] ABSTRACT

An optical switch for thin-film light guides utilizes electrically induced changes in the index of refraction of the switch material to produce the switching effect. Electrodes located along the length of the switch material and separated from it by an insulating layer induce an electric field in a region of the switch material when a voltage difference is applied to them. This causes the index of refraction to increase in that region to such an extent that a light guide is formed in the switch material, allowing transmission through the switch. Removal of the voltage destroys the guide, thereby stopping transmission.

4 Claims, 2 Drawing Figures

PATENTED APR 2 1974 3,801,185

SWITCH FOR THIN-FILM OPTICS

BACKGROUND OF THE INVENTION

This invention relates to thin-film light guides and, more particularly, to electro-optic switches for thin-film light guides.

A great deal of work has been done in recent years on integrated optics and thin-film light guides for use in optical communication systems. However, the development of modulators or switches which operate to modulate directly the amplitude of the light in these thin-film light guides has been rather limited. One of the techniques which has been used to modulate light indirectly involves the use of phase modulation. This type of modulation is accomplished by introducing a phase difference between two orthogonal states of light polarization by means of apparatus relying on the Pockels' effect and then using an optical analyzer to convert the phase modulation to amplitude modulation. This technique for modulating light can be adapted to thin-film guides by utilizing the fundamental TE and TM modes in the guide. Also, wideband modulation can be achieved using these principles by synchronizing the phase volocities of the optical wave with an applied microwave field. Polarized light traveling in a thin-film guide can, also, be directly modulated by using some means to raise the appropriate index of refraction of the substrate of the guide, thereby allowing light to leak out of the guide material.

However, most of the high frequency modulators do not modulate intensity directly. They make use of a split light beam with a phase shift in one path, followed by a recombination of the light energy to produce intensity modulation by interference between two beams. Such devices require very critical adjustments to achieve reasonable extinction ratios. Also, the other forms of modulation require either complicated additional circuitry or have poor extinction ratios. For example, the electro-optic Pockels' effect modulator requires the inclusion of an optical analyzer somewhere in the transmission path and the microwave modulator requires a high frequency voltage source. The switches which operate by varying the index of the substrate require the fabrication of a thin-film guide with a substrate having an index subject to change by some outside influence.

Therefore, the object of this invention is the direct amplitude modulation, with good extinction ratios and at high frequencies, of light traveling in a thin-film guide, without the need for critical alignment of elements and complicated additional apparatus.

SUMMARY OF THE INVENTION

The present invention is directed toward simplifying the structure needed to create a switch for thin-film light guides by relying on induced localized changes in the index of refraction of the switch material which cause it to act as a light guide.

In an illustrative embodiment of the invention, the switch consists of a section of flat electro-optic substrate such as KDP with a raised ridge along its length. The ridge area of the substrate is covered on all three sides by a dielectric material such as PMMA. Imbedded in the dielectric material along opposite sides of the ridge are electrodes. When the light beam is introduced into the ridge area from one end of a thin-film guide, it will escape into the other portions of the substrate when no voltage is applied to the electrodes. However, an electric field in the ridge area caused by the application of a voltage to the electrodes will raise index of refraction in that area, thereby preventing the light from escaping into the rest of the substrate. In effect, the application of an electric field induces a waveguide in the ridge area, allowing transmission through the switch for the light from the waveguide. Removal of this field destroys the waveguide, blocking transmission.

The foregoing and other features of the present invention will be more readily apparent from the following detailed description and drawings.

DETAILED DESCRIPTION

Figure 1:
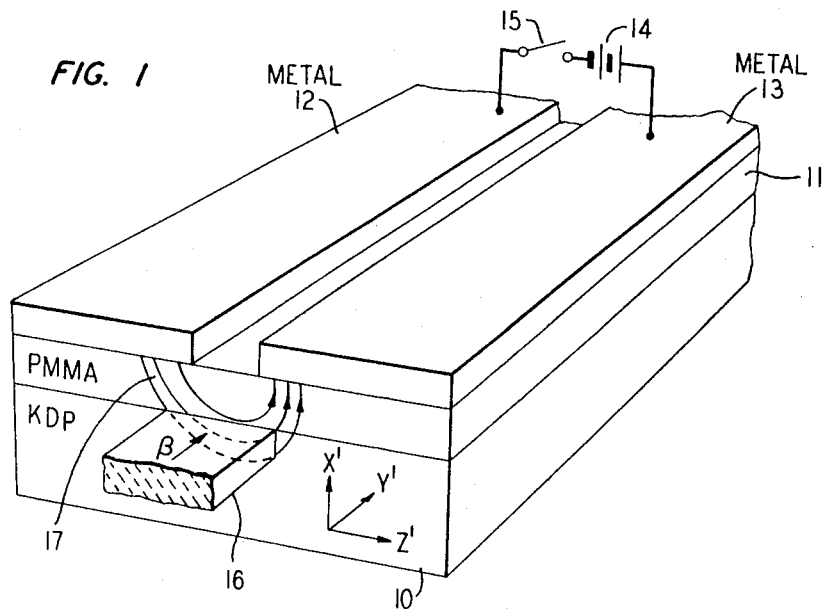
FIG. 1 is an illustrative embodiment of the invention with a nonuniform electric field.

FIG. 1 is a simplified form of a switch useful in a thin-film light guide system. One segment of the thin-film light guide 16 is placed in contact with the crystalline switch material 10, as indicated in FIG. 1. The light traveling in the guide 16 is represented by the arrow $\beta$ in FIG. 1. Another segment of the thin-film light guide, not shown in FIG. 1, would be in contact with the opposite side of the switch material to collect the output power. This switch material can be any electro-optic material which has an index near that of the thin-film guide. At the present state of the art, this will generally be either potassium dihydrogen phosphate (KDP) or ammonium dihydrogen phosphate (ADP), since they are among the few materials with a refractive index near that of the common glasses and plastics. Overlaying the switch material 10 in FIG. 1 is a dielectric insulating layer 11, having an index of refraction lower than that of the switch material. This insulating material can be a substance such as poly(methyl methacrylate) (PMMA) about one micron thick. On top of the insulating material are located two metal electrodes 12 and 13 which are parallel to the Y' direction of the switch material 10 as shown in FIG. 1. Connected in series between these two electrodes is a voltage source 14 and a switch 15. When switch 15 is closed, the voltage source 14 will create an electric field between the two electrodes which extends into the switch material. When this field is present, the principal directions of the crystal are indicated by the coordinates X', Y' and Z', shown in FIG. 1. The X' and Y' axes are rotated 45° from the X and Y axes of the crystal and the Z' axis is in the same direction as the Z axis of the crystal. The voltage applied to the electrodes produces a fringing field 17 along the Z' direction of switch material 10 near its interface with the insulating material 11. The field intensity is a maximum near the electrodes and decreases rapidly in the material away from the electrodes. The insulating layer 11 is necessary in order to avoide excessive losses from the optical fields extending near the metal electrodes. This entire device can be incapsulated in a high field strength dielectric medium to protect it from physical damage and to increase the allowable electric field which can be created before breakdown occurs between the electrodes.

With the arrangement of FIG. 1, the application of an electric field to the switch material causes a region of it to act as a light guide. Therefore, optical energy with its polarization along the X' direction would be guided due to the creation of an electro-optically induced waveguide. This switch, however, produces a defocusing effect in the Z' direction resulting in one-dimensional guidance. To correct this defocusing effect, two-dimensional guidance is necessary. Such a switch is shown in FIG. 2.

Figure 2:
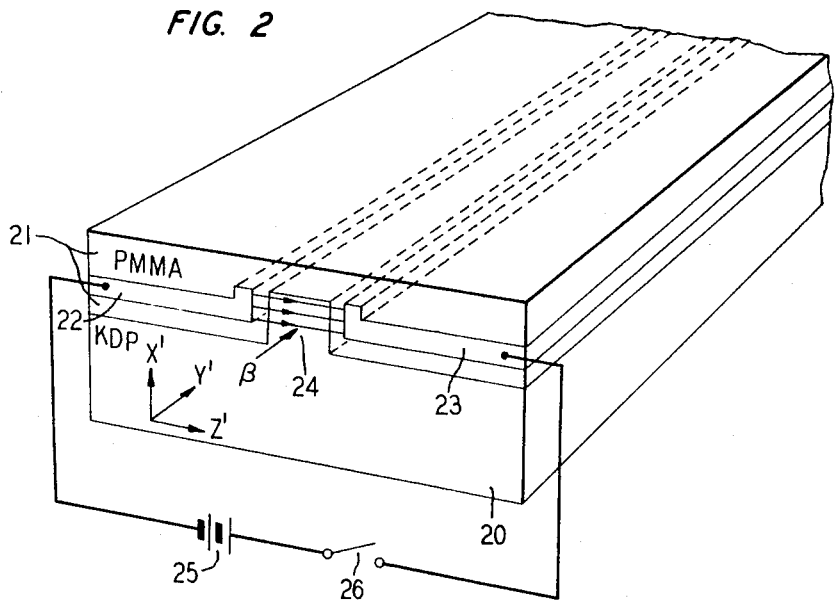
FIG. 2 is an illustrative embodiment of the invention with a uniform electric field.

In FIG. 2, the crystalline switch material 20 has a raised ridge 24 extending along its length. The thin-film light guides which are carrying the light to be switched are placed in contact with the ridge area and the light traveling in the guides is indicated by arrow $\beta$ in FIG. 2. The width of the ridge would depend on the depth of the guide and the difference in the indices of the surrounding regions. Overlaying the ridge area on all three sides is the dielectric insulating material 21 which has a lower index of refraction than the switch material 20. Imbedded in the insulating material and extending along opposite sides of the rige area are electrodes 22 and 23. These electrodes produce a uniform field in the switch area, when voltage source 25 is connected between them, by closing switch 26.

When switch 26 is open, light from the thin-film guide indicated by the arrow $\beta$ will escape from the ridge area and diffuse throughout the switch material 20, thereby stopping transmission. However, when switch 26 is closed, an electric field is generated in the ridge area which raises its index above that of the rest of the switch material. This prevents light from leaving the ridge area and allows the transmission to take place through it. Since the field in the ridge area is two-dimensional, there will not be any defocusing effect in the Z' direction.

These techniques can be applied to other electrooptic materials by appropriate choice of coordinates. For example, when lithium niobate ($LiNbO_3$) or lithium tantalate ($LiTaO_3$), both 3m group crystals, are used, the X, Y, and Z coordinates do not change with the application of the electric field along the Z direction. Therefore, the axes X', Y' and Z' would be replaced in FIG. 2 with the ordinary axes of the crystal. However, when these materials are used, an insulating material having an index closer to them than PMMA should be used.

While the invention has been particularly shown and described with reference to preferred embodiments thereof, it will be understood by those skilled in the art that various changes in form and details may be made therein without departing from the spirit and scope of the invention. In particular, the switches described could have a bend along their length which would enhance light loss when the field was not present. This would allow a shorter length switch to have the equivalent light blocking power of a longer straight switch.

We claim:

1. An electro-optic switch comprising:
   a substrate of electro-optic material having a raised ridge extending longitudinally along one surface;
   a dielectric material covering said ridge, the index of refraction of said dielectric material being less than the index of refraction of said substrate; and
   means for raising the index of refraction of said ridge above that of the rest of said substrate in a substantially uniform manner, comprising first and second ridge electrodes located along opposite sides of said ridge, respectively, and means for applying a voltage between said electrodes.

2. An electro-optic switch comprising:
   a substrate of electro-optic material having an elongated raised ridge disposed on one surface thereof;
   a layer of dielectric material overlying said surface including said ridge, the index of refraction of said dielectric material being less than the index of refraction of said substrate; and
   means for raising the index of refraction of said ridge above that of the rest of said substrate in a substantially uniform manner, comprising first and second electrodes imbedded in said layer of dielectric material along opposite sides of said ridge, respectively, and means for applying a voltage between said electrodes.

3. An electro-optic switch as claimed in claim 2 wherein said dielectric material consists of poly(methyl methacrylate) (PMMA).

4. An electro-optic switch as claimed in claim 2 wherein the electro-optic material of said substrate is selected from the group of materials consisting of potassium dihydrogen phosphate (KDP), lithium niobate ($LiNbO_3$), lithium tantalate ($LiTaO_3$), and ammonium dihydrogen phosphate (ADP).

* * * * *